United States Patent

Wagner

[11] Patent Number: 5,234,286
[45] Date of Patent: Aug. 10, 1993

[54] UNDERGROUND WATER RESERVOIR

[76] Inventor: Kenneth Wagner, 9232 S. Sawyer, Evergreen Park, Ill. 60642

[21] Appl. No.: 817,790

[22] Filed: Jan. 8, 1992

[51] Int. Cl.⁵ .............................................. E04D 13/00
[52] U.S. Cl. ........................................ 405/53; 405/36; 137/357; 137/565; 220/4.13; 220/4.24
[58] Field of Search ............... 137/256, 357, 386, 391, 137/398, 399, 565, 578, 579; 220/4.12, 4.13, 4.24, 4.26, 669; 405/36, 52, 53-55

[56] References Cited

U.S. PATENT DOCUMENTS

| | | | |
|---|---|---|---|
| 1,460,613 | 7/1923 | Sill | 137/357 X |
| 2,431,640 | 11/1947 | Gordon | 137/398 X |
| 4,106,338 | 8/1978 | Castle | 73/302 |
| 4,159,781 | 7/1979 | Bartlow et al. | 220/4.13 |
| 4,161,186 | 7/1979 | Sitarz | 137/357 |
| 4,527,927 | 7/1985 | Bucherre | 405/53 |
| 4,589,798 | 5/1986 | Milly | 405/36 |
| 4,620,817 | 11/1986 | Cushing | 405/36 X |
| 4,667,841 | 5/1987 | Belle | 220/4.12 X |
| 4,753,368 | 6/1988 | Lescaut | 220/4.12 X |
| 4,827,762 | 5/1989 | Hasselmann | 73/49.2 |
| 4,934,404 | 6/1990 | De Stefano | 137/357 |
| 4,949,626 | 8/1990 | Townsend et al. | 137/565 X |
| 4,978,249 | 12/1990 | Killman | 405/303 |
| 5,017,044 | 5/1991 | Sharp | 405/53 |

FOREIGN PATENT DOCUMENTS

| | | | |
|---|---|---|---|
| 1906489 | 1/1970 | Fed. Rep. of Germany | 220/4.12 |
| 1356532 | 1/1964 | France | 220/4.12 |

Primary Examiner—Dennis L. Taylor
Assistant Examiner—John Ricci
Attorney, Agent, or Firm—David C. Brezina

[57] ABSTRACT

An underground water storage reservoir has a molded tank of attachable upper and lower bodies, the bodies being of common geometry nestable for storage and transportation prior to installation, the installed reservoir co-acting with a precipitation receiving roof of a building, water inlet, conduits, valve and overflow, controllable pump and a sump to utilize water from the reservoir.

16 Claims, 3 Drawing Sheets

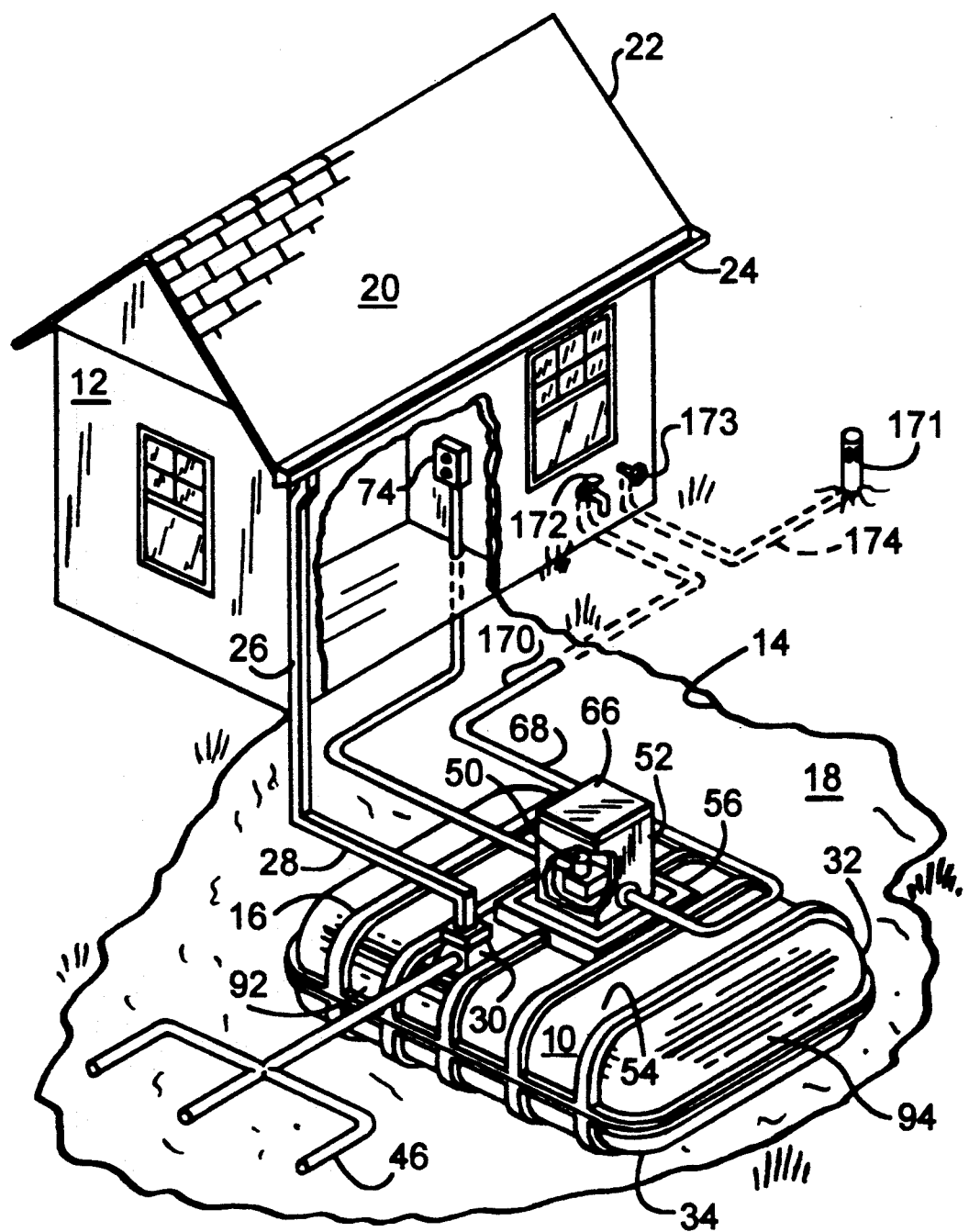

UNDERGROUND WATER RESERVOIR

BACKGROUND OF THE INVENTION

1. Field of the Invention

The invention relates to a reservoir for fluids, specifically for water, to be used in association with a building, preferably but not exclusively a residence. The reservoir is manufactured in sections for ease of manufacture, transport and assembly and is reinforced and designed for burial underground to provide weather protected and unobtrusive service.

Associated with the reservoir is an inlet connected to an appropriate collection arrangement, in the preferred embodiment being a roof, gutter and downspout assembly of the building roof gutter system. Inlet and overflow control is provided for by a valve. The water is removed through a pump apparatus controlled from inside the building. A sump for collecting sediment and a filter is also provided.

2. Description of Related Art

While the prior art shows underground storage tank for fluids, applicant believes that none of the prior art either teaches or suggests the novel and nonobvious embodiment disclosed in this application including the structure of the reservoir, inlet/overflow arrangement, outlet and pump assembly and alternative end uses. Nevertheless, applicant submits the following art as indicative.

U.S. Pat. No. 4,527,927 issued Jul. 9, 1985 to Bucherre shows a water collection apparatus and flexible bladder reservoirs. Bucherre only implicitly addresses adaptation to utilizing a building roof gutter system to collect water. Bucherre further uses a manually operated valve to direct overflow to a ditch, completely differently than the instant invention. Bucherre uses a filter at the inlet not at the outlet thereby providing no material filtering of particulates or other matter which may be in the reservoir from whatever cause.

The invention uses a float operated valve to close the inlet and open the overflow conduit thereby redirecting water to a drain or overflow network when the tank is full. U.S. Pat. No. 4,106,338, issued Aug. 15, 1978 to Castle uses a ball operated valve to close an outlet, not to redirect an inlet.

The instant invention enables use of a level indicator to enable remote monitoring of the status of the reservoir. An elaborate inventory control system using underground reservoirs, particularly addressing petroleum storage and marketing, is shown in U.S. Pat. No. 4,827,762 issued May 9, 1989 to Hasselmann. This addresses a completely different embodiment than the instant invention.

U.S. Pat. No. 4,978,249 issued Dec. 18, 1990 to Killman uses a recirculation conduit for overflow from errors in filling of, primarily, petroleum storage reservoirs. This deals with a completely different embodiment than the instant invention having an automatic overflow for drain-off of environmentally safe rain water.

SUMMARY OF THE INVENTION

A object of the invention is to provide a self contained water reservoir for a residence unobtrusively located below a landscaped area yet being accessible for maintenance and operation.

Another object of the invention is to provide for maximized effective usage of naturally occurring precipitation for use at future desired times by maintaining water derived from precipitation in a protected reservoir.

Another object of the invention is to provide a durable water reservoir with structural integrity and ease of maintenance.

Another object of the invention is to provide for an underground storage reservoir capable of economic manufacture and shipment with ease of on-site assembly.

Another object of the invention is to provide for efficient use of an underground storage reservoir through maximizing usage of requisite controls commensurate with operating effectiveness and economy.

Another object of the invention is to provide for appropriate handling of overflow consistent with a landscaped residential installation and the needs for adequate foundation for the reservoir.

Other objects of the invention will become apparent upon reviewing the specification.

BRIEF DESCRIPTION OF THE DRAWINGS

FIG. 6 is a perspective view of an alternative embodiment of the invention as installed.

DETAILED DESCRIPTION OF THE PREFERRED EMBODIMENT

Figure 1:
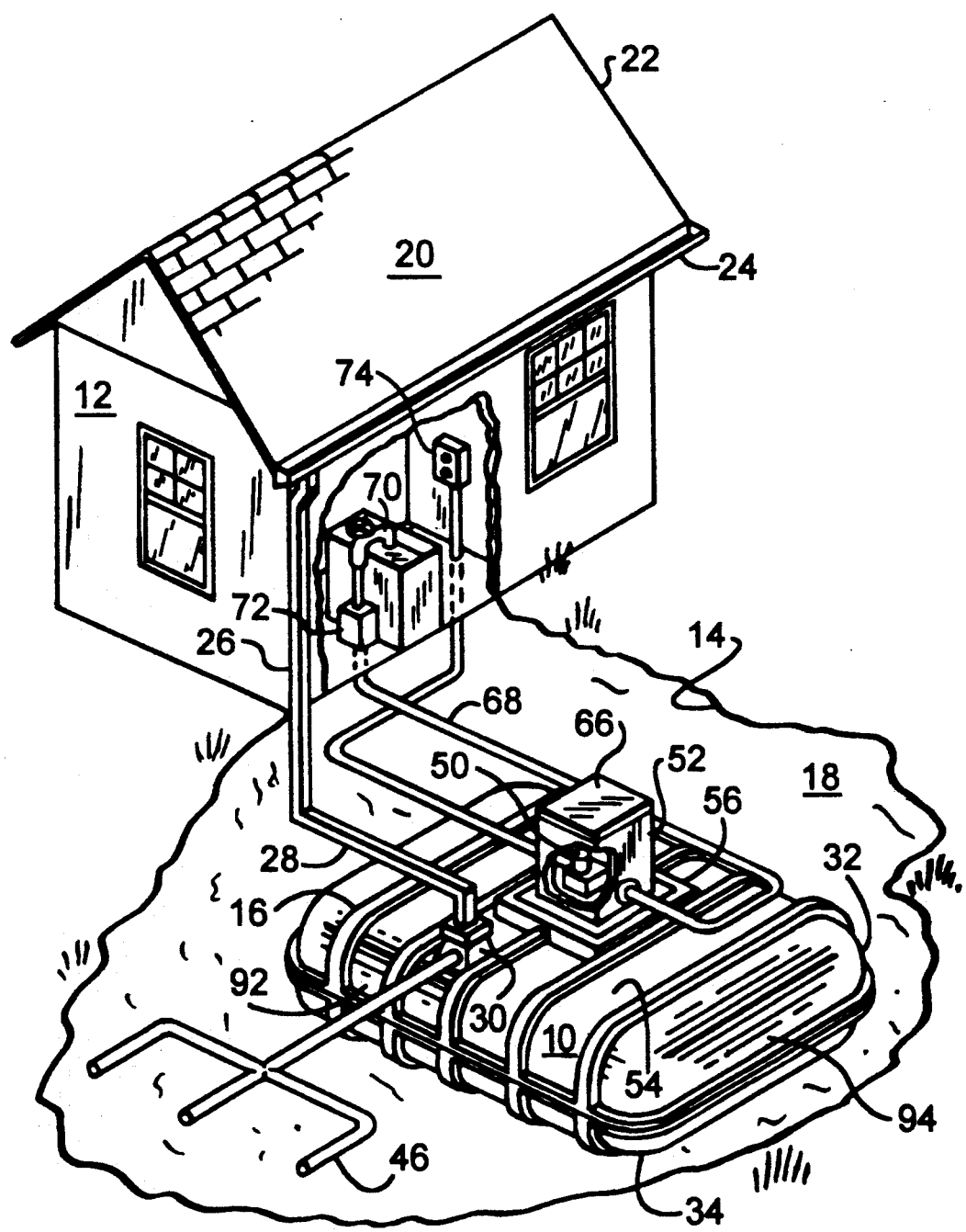
FIG. 1 is a perspective view of the invention as installed.
Figure 2:
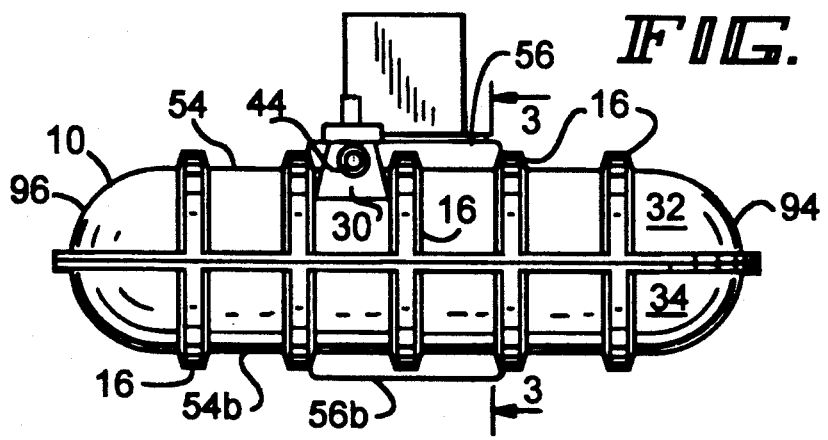
FIG. 2 is a side elevation view of an assembled reservoir.
Figure 3:
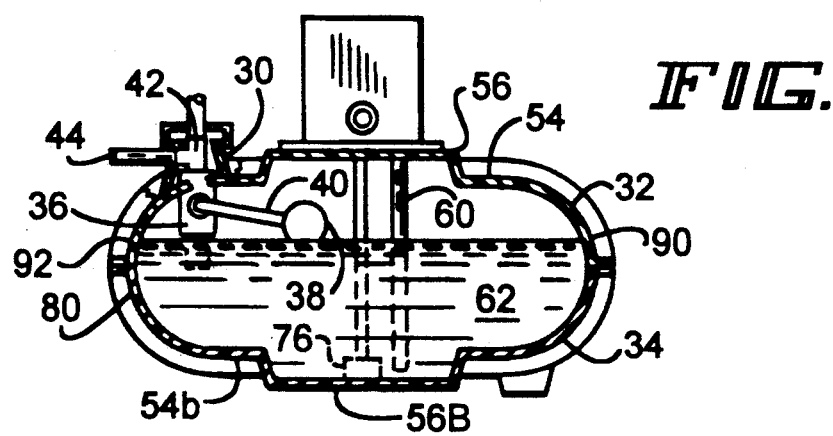
FIG. 3 is a section of an assembled reservoir.
Figure 4:
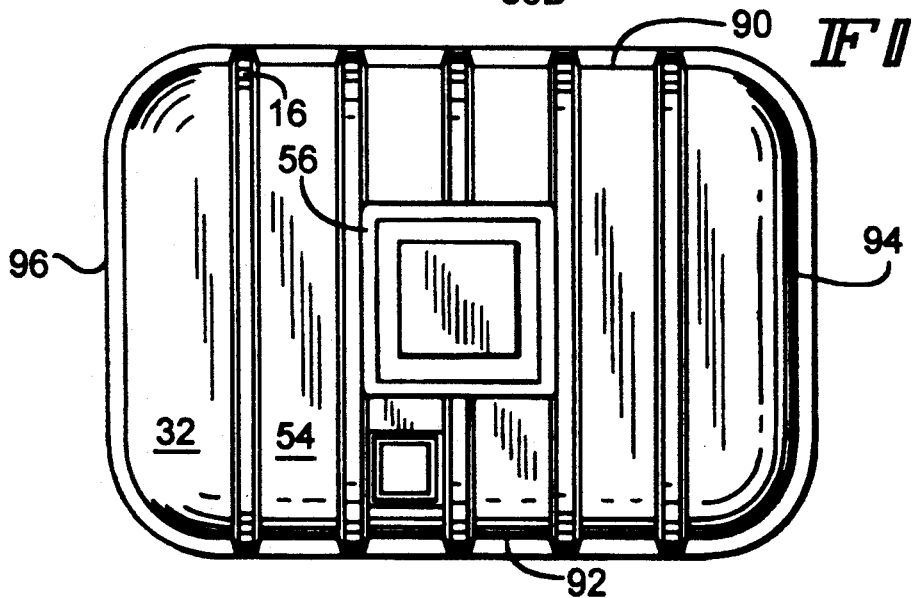
FIG. 4 is a top plan view of an assembled reservoir.
Figure 5:
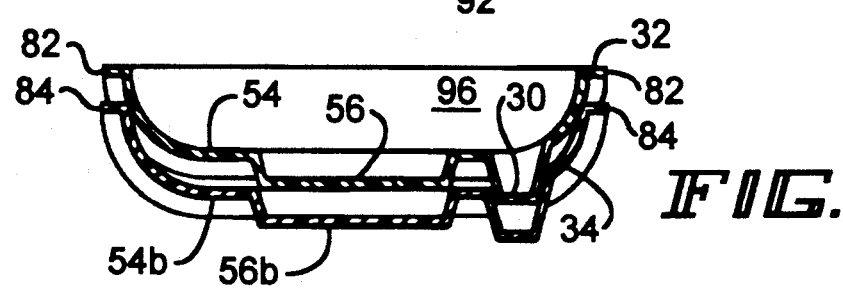
FIG. 5 is a sectional view of an unassembled reservoir.

A reservoir or tank 10 is provided for storage of a fluid, particularly water associated with a building 12, primarily a residence. The reservoir or tank 10 is designed for underground installation below grade 14 and accordingly is suitably constructed of corrosion proof material. The tank 10 has reinforcing ribs 16 applied in such a manner as to adequately distribute loads imposed by soil or fill 18 or the like placed above and around the reservoir.

The tank 10 in the preferred embodiment is constructed of a molded thermoplastic such as polypropylene. Other appropriate material known to one skilled in the art which may include related plastics, glass reinforced plastic or an appropriately composed or finished metal.

The tank may be constructed in segments and of a shape or geometry which permits fabrication in upper or top 32 and lower or bottom 34 bodies which can be nested in one another for shipping thereby reducing the volume used in a shipping vehicle. As can be seen in the drawings the reservoir 10 in the preferred embodiment has a top or upper panel 54, bottom or floor panel 54b, first 90 and second 92 side portions and first 94 and second 96 end portions. In the preferred embodiment, the sides 90,92 and ends 94,96 include arcuate sections merging smoothly into the respective top and bottom panels 54,54b. These are molded in a form providing adequate draw or taper for removal from the mold. The configuration of the invention also permits a number of the bodies to be inverted and nested for transportation in a disassembled condition. This provides for strength in use, and ease of manufacture and transportation.

Other alternative segmentary arrangements such as panels joined at ribs 16 may also serve the same end. These features function for holding said liquid until needed in the reservoir 10 which has side 90,92 and end 94,96 walls, floor panel 54b and top panel 54. Ribs 16 reinforce for structural integrity when buried below grade level in proximity to the building with which the apparatus is associated.

As an apparatus 20 to catch rain, in the preferred embodiment the roof 22, gutter 24 and downspout 26 system of a building feed an inlet 28 conduit or pipe which directs the flow of water to a tank inlet 30 of the tank 10. These features function to collect meteorological precipitation on the building and direct the liquid from the building to the reservoir.

The aforementioned conduit 28 is connected to a valve 36 which, in its open position, will permit flow of collected water into the tank. The valve is open when the water level is below a first level. The valve 38 incorporates a float 38 operated lever 40 which closes the valve 36 when the water reaches a second, "full" level. The valve housing 42 is arranged to then divert water as when valve 36 is closed into an overflow conduit which is directed away from the tank 10 and building 12. A suitable dispersal network such as a field of drain tiles provides absorption into the soil with minimal erosion. In this manner the invention provides for controlling the inlet of liquid into the reservoir and to selectively flow the liquid into either the reservoir 10 or the overflow network.

A pump 50 is mounted in a housing 52 on the upper surface or panel 54 of the tank. In the preferred embodiment this is mounted on an integrally molded raised flat platform 56. A wall or web 55 extends continuously from surface 54 spacing the platform 56 therefrom and supporting platform 56 above surface 54 spacing the pump mount slightly above the upper surface or panel 54 of the tank and between reinforcing corrugations or ribs 16 molded into the tank. This configuration provides for identical molding of top 32 and bottom 34 bodies or halves with nesting of the integral platform portions when inverted for shipment while further providing for use of one of the opposed platforms 56 and 56b in the lower tank half as a sump while adapting the upper for use as a pump mounting and cutting away for an access or inspection opening.

The pump 50 is therefore mounted entirely above the highest part of tank 10. The pump assembly includes a pipe or leg 60 extending downwardly into the tank for extraction of water 62 therefrom. The housing 52 for the pump in the preferred embodiment comprises a substantially box-like structure protecting and separating the pump from the soil 18 filled in thereabove and extends to the surface of the soil providing for access through a manhole or other appropriate hatch 66 arrangement.

The pump utilizes a part of the reservoir outlet assembly the aforementioned inlet pipe 60, an appropriate pump 50 machinery as is known to one of ordinary skill in the art and a pressurized pump outlet conduit 68 to which is connected to the building plumbing system for the applications desired, e.g., sink, non potable water, sprinkler system including a water treatment system or filter 72 as desired. The pump has a control located in the building which permits operation in accordance with the control either by a manual selection switch 74 or by semi-automatic selection as by a pressure switch, known to one of ordinary skill in the art. A second control 76 identifying water level, including a low water cut-off switch is provided. The low water cut-off switch will override or shut down the pump system when the control or sensor 76 identifies inadequate water is present in the reservoir. These features enable the removing of the liquid from the reservoir and distributing said liquid for use.

As previously described integral sump 56b is molded into the lower body 80 of the reservoir. This may be of the preferred embodiment configuration in which a single molded area provides respectively for the pump housing in the top body 32 and sump in the bottom body 34, depending on the orientation of the body as top or bottom.

In the preferred embodiment the upper 32 and lower 34 bodies or halves are joined at a common intersection by the engagement of mating top 82 and bottom 84 circumferential flanges having surfaces sealed to one another through gaskets, caulking, sealers, compounds or adhesives, as are known to one of ordinary skill in the art. Mechanical fasteners such as bolts, screws or rivets can supply additional structural strength to the sealing method selected. When so finished the tank or reservoir becomes a structurally sound and water tight envelope. In the preferred embodiment, bolted flanges provide for optimal structural integrity and sealing particularly under the loads imposed by the weight of the bill above the tank.

An alternative embodiment provides for usage of even non-potable water for certain tasks. In this embodiment dispensing with the interior controls 74, filter 72 and interior faucet 70 can lead from the reservoir to an exterior faucet or valve 172 which may be selfcontained on plumbed in parallel with other lines 174 and controls 173 such as valves known to one of ordinary skill in the plumbing art to even a ground embedded sprinkler system 171 or other irrigation system. This alternative embodiment can be seen as advantageous in that it dispensing with water purification needs, as by filter 72, while permitting usage of collected water for such alternative tasks as car washing, lawn sprinkling or irrigation, which usage may be particularly useful in areas susceptible to long term droughts and rationing of municipal supplied water.

In accordance with my invention, I claim:

1. An reservoir for underground water storage associated with a building having a roof receiving precipitation comprising:

a structurally reinforced tank being elongate and shallow, and being constructed of two attachable upper and lower bodies;

a water inlet feeding water into the tank;

a conduit transmitting water from the roof to the inlet;

valve selectively controlling water entry into the tank;

an automatically actuated overflow associated with the valve for directing water away from the reservoir when the valve is to so control the water;

a pump integrally housed on the reservoir in a compartment, said compartment being accessible to the surface;

an outlet conduit associated with the pump for directing retained water to a selected location;

a first control for selectively operating the pump, being located remote from the reservoir in the building;

a second control associated with the first control to deselect said first control when inadequate water for pumping is in the reservoir;

a sump integrally formed in the lower body for trapping sediment;

said upper and lower bodies being of a common geometry so as to be formed from the same molds and adapted for nesting in one another prior to assembly for use.

2. The reservoir of claim 1 further comprising:

each of said bodies having a flanged perimeter adapted for sealing with and mechanically fastening to the other body.

3. The reservoir of claim 2 further comprising:

each of said bodies having a substantially planar panel remote from and parallel to the plane of said perimeter;

a platform being spaced from said panel;

said spaced platform being supported by a continuous web thereby forming a continuous water tight surface of said panel, platform and web;

said platform forming a pump support when in the top body and a sump when in the lower body.

4. The reservoir of claim 3 and said overflow further comprising a float operated valve which closes the entry into the tank and redirecting said flow to an overflow pipe;

said overflow pipe directing said overflow water to a place remote from said reservoir for drainage.

5. The reservoir of claim 4 and said second control comprising a low water cut-off switch which renders the pump inoperative when there is insufficient water in the tank.

6. The reservoir of claim 5 and said structurally reinforced tank further comprising a plurality of molded hollow ribs composed of a series of webs molded in the surface of said bodies;

said perimeters having first and second sides and first and second end portions;

said ribs extending from said perimeter over said panels from said first side to said second side.

7. The reservoir of claim 6 and said outlet conduit being adapted to direct water flow from the reservoir to a selected location being one of a tap inside the building, a tap outside the building or an irrigation device.

8. A liquid storage reservoir for a building comprising:

means for holding said liquid until needed having walls, floor panel and top panel, and being reinforced for structural integrity when buried below grade level in proximity to said building;

means for collecting meteorological precipitation on the building and directing the liquid from the building to the reservoir;

means for controlling the inlet of liquid into the reservoir to automatically selectively flow the liquid into one of the reservoir or an overflow network;

means for removing the liquid from the reservoir being a pump with an intake and an outlet, the outlet directing flow to a desired location, and having a low water sensor including a cut-off to stop the pump;

means for distributing said liquid for use to one of either the interior or exterior of said building; and said means for holding further comprising an elongate and shallow envelope of substantially rigid sheet material formed with arcuate corner joining said walls and panels, and being reinforced by molding substantially "U" section ribs as portions of said sheet and having an integrally molded shape forming a platform and sump wherein said shape forms the platform when in said top panel and forms the sump when in the bottom panel.

9. The reservoir of claim 8 and said means for holding further comprising a plurality of commonly shaped sections forming at least a top and a bottom, being adapted to nest one within another for transport and for joinder at a perimetrical flange to form the reservoir.

10. The reservoir of claim 9 said means for controlling inlet of liquid further comprising:

a valve for stopping liquid flow into said means for holding, being controlled by a liquid level sensitive actuator so as to stop said flow when the means for holding is substantially full;

a overflow port in the inlet conduit being associated with the valve in such a manner as to direct the flow to the overflow network when the liquid flow into the means for holding is stopped;

said overflow network dispensing said remote from said means for holding so as to minimize erosion thereunder.

11. The reservoir of claim 10, said means for removing the liquid further comprising:

a remotely operateable pump having a switch located in the building;

said pump being mounted on said platform integrally molded in said envelope and being raised above the panel;

said pump further being contained within a housing;

said reservoir being placed below grade level in association with said building;

said housing projecting to said grade level to provide service access to said pump.

12. The reservoir of claim 11 said means for distributing said liquid further comprising:

a filter and faucet contained within the building being adapted to provide potable water in said building.

13. The reservoir of claim 11 and said means for distributing said liquid further comprising:

an irrigation apparatus for distribution of stored water to a selected portion of said grade level by operatively activating said means for removing the liquid.

14. A water storage reservoir in association with a building comprising:

a roof and gutter system on said building directing precipitation flow to a downspout;

an underground storage tank molded from a pair of top and bottom shapes of substantially identical geometry, said tank having an inlet and an outlet; said tank being a substantially shallow shape having arcuate ends and sides above a floor panel and below a top panel and further having a plurality of reinforcing ribs supporting said shape when buried below grade level;

an intake conduit directing flow from said downspout to said inlet;

a float valve associated with said inlet for opening said inlet when the water level is below a first level and closing said inlet when said water level is at a second level;

an overflow network distributing flow from said inlet conduit away from said tank when said valve is closed;

a pump associated with said outlet having a pump inlet pipe for raising water from said tank to said pump and having an outlet conduit directing said flow from said pump to a desired location in association with said building;

said pump being mounted on a platform integrally formed in and raised above said top panel and said pump inlet pipe extending to and terminating in close association with an integrally formed sump formed in and extending below said bottom panel;

said sump and said platform being molded in said bodies so that said bodies may be inverted when disassembled for transport and may be produced from the same molds.

15. The reservoir of claim 14 and said tank top and bottom shapes each having a continuous perimetrical flange adapted for mating with the corresponding flange of the other.

16. The reservoir of claim 15 and said top and bottom shapes being of a molded sheet material molded to a form having adequate draw for removal from a mold and also of a form adapted to nest inside one another for transportation when in a disassembled condition.

* * * * *